April 7, 1964  I. J. ALLEN  3,128,401
ELEMENT FOR EDDY CURRENT DEVICES
Filed Aug. 1, 1960  2 Sheets-Sheet 1
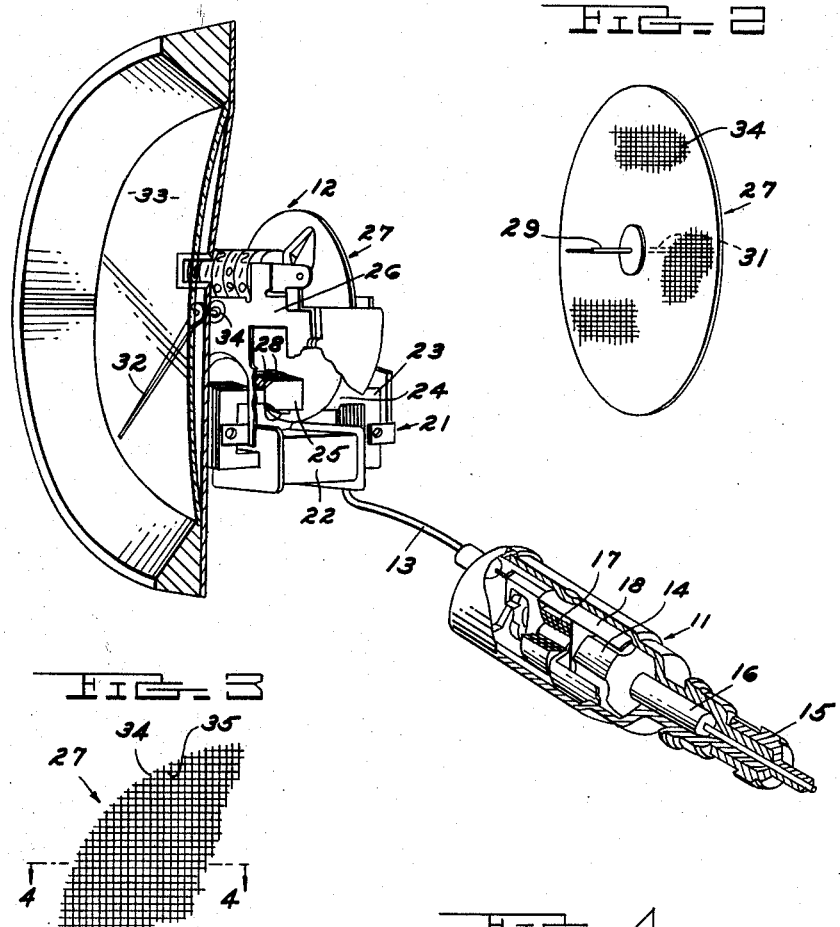
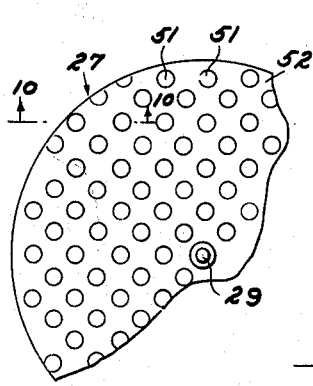
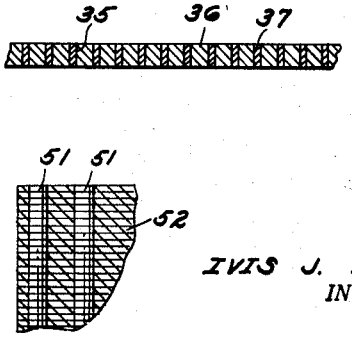
IVIS J. ALLEN
INVENTOR.
BY J. R. Faulkner
K. L. Zerschling
ATTORNEYS April 7, 1964        I. J. ALLEN        3,128,401
ELEMENT FOR EDDY CURRENT DEVICES
Filed Aug. 1, 1960        2 Sheets-Sheet 2
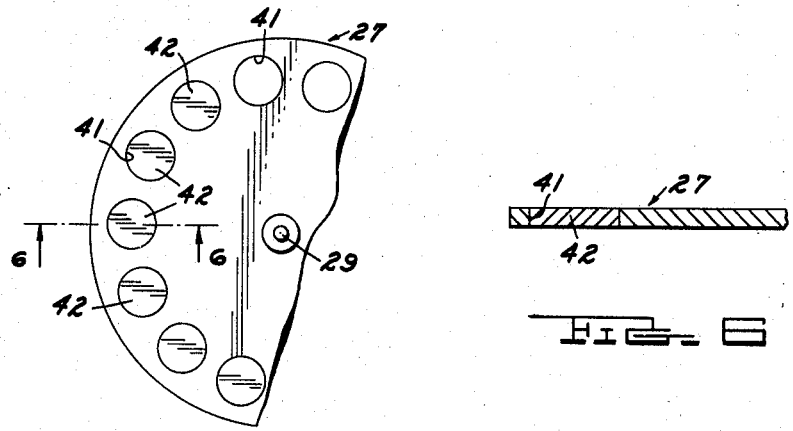
FIG. 5
FIG. 6
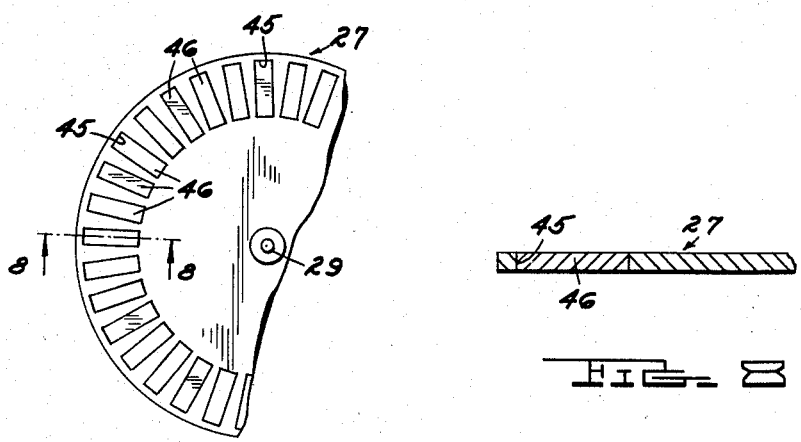
FIG. 7
FIG. 8
IVIS J. ALLEN
INVENTOR.
BY J. R. Faulkner
K. L. Zerschling
ATTORNEYS

United States Patent Office 3,128,401
Patented Apr. 7, 1964

3,128,401
ELEMENT FOR EDDY CURRENT DEVICES
Ivis J. Allen, Ann Arbor, Mich., assignor to Ford Motor Company, Dearborn, Mich., a corporation of Delaware
Filed Aug. 1, 1960, Ser. No. 46,801
6 Claims. (Cl. 310—106)

This invention relates to eddy current induction devices and more particularly to eddy current discs for use in eddy current mechanisms, such as motors or meters.

In conventional eddy current devices, such as eddy current motors and eddy current meters, solid discs constructed of a nonmagnetic electrical conductive material such as copper or aluminum are rotatably mounted between the poles of an electromagnet. The winding of the electromagnet is ordinarily connected to a source of alternating electrical energy so that as the poles of the electromagnet are changed in polarity by the source of alternating electrical energy, eddy currents are induced in the disc. These eddy currents react with the flux created by the electromagnet to produce a torque on the disc thereby causing it to rotate. The disc may be suitably affixed to indicator dials or any desired device through suitable mechanisms such as reduction gears to torque balancing hair springs.

The present invention provides an improved eddy current induction device or disc that increases the torque obtainable from such devices. This is especially important in eddy current devices that may be manufactured on a mass production basis. The eddy current induction device or disc of the present invention may readily be employed in speedometers for automotive vehicles. In order to be economically feasible, such speedometers must be produced on a mass production basis and as inexpensively as possible. This precludes expensive bearings for the eddy current device or disc and the holding of close tolerances, therefore, it may require more torque to rotate eddy current devices or discs so employed than would be required to rotate eddy current discs employed in precision made instruments such as induction watt-hour meters.

In order to provide an eddy current induction device or disc that will produce substantially more torque than conventional eddy current discs, the applicant has provided a disc constructed of spaced portions of magnetic material with the spaced portions of magnetic material being surrounded by electrical conductive material. The electrical conductive material may have a lower permeability than that of the magnetic material. In one embodiment of the invention the disc is composed of a copper or aluminum screen having powdered iron pressed into the openings therein. Several other embodiments of the invention are also contemplated to produce a device having portions of spaced magnetic material surrounded by electrically conductive material. The portions of magnetic material provide areas of increased magnetic flux density in the device or disc over that obtainable with the nonmagnetic material employed in conventional discs. These areas of increased flux density cause increased eddy currents to be induced in the electrical conductive material surrounding these areas. These larger currents react with the flux of the electromagnet to produce a greater amount of torque on the device or disc than is possible with conventional eddy current devices.

An object of the invention is the provision of an improved eddy current induction device or disc.

A further object of the invention is to provide an eddy current induction device or disc that is capable of producing a large amount of torque in comparison with conventional eddy current devices or discs.

Still another object of the invention is the provision of an eddy current device or disc that may be economically and feasibly employed in eddy current mechanisms produced on a mass production basis.

Other objects and attendant advantages of the present invention will become more readily apparent as the specification is considered in connection with the accompanying drawings in which:

FIG. 1 is a perspective view partially in section of an electric speedometer in which the eddy current induction device or disc of the present invention may be employed;

FIG. 2 is a perspective view of one embodiment of the eddy current induction device or disc of the present invention;

FIG. 3 is a partial elevational view of a portion of the device or disc shown in FIG. 2;

FIG. 4 is a cross sectional view taken along the lines 4—4 in FIG. 3;

FIG. 5 is a partial elevational view of another embodiment of the invention;

FIG. 6 is a cross sectional view taken along the lines 6—6 of FIG. 5;

FIG. 7 is a partial elevational view of another embodiment of the invention;

FIG. 8 is a cross sectional view taken along the lines 8—8 of FIG. 7;

FIG. 9 is a partial elevational view of a cylindrical block of material from which another embodiment of the invention may be cut; and FIG. 10 is a cross sectional view taken along the lines 10—10 of FIG. 9.

Referring now to the drawings in which like reference numerals designate like parts throughout the several views thereof, there is shown in FIG. 1 an electric speedometer that may employ the eddy current induction device or disc of the present invention. This electric speedometer includes an alternator transmitter 11 suitably connected to a stalled torque-eddy current receiver 12 by means of suitable connecting leads designated 13.

The alternator transmitter 11 includes a permanent magnet rotor 14 driven through a gear 15 and a shaft 16 from a rotating portion of an automobile vehicle, for example, from the transmission. The field coils 17 of the alternator transmitter are provided with field pole pieces 18 that extend from the field coils over the permanent magnet rotor. When the rotor 14 of the alternator transmitter is rotated, it produces an alternating current in the field coils 17 that is fed to the stalled torque-eddy current receiver 12 through the lead 13.

The stalled torque-eddy current receiver 12 includes an electromagnet, generally designated by the numeral 21. This electromagnet has a winding or coil 22 connected to the lead 13 and is mounted upon a core of magnetic material, designated by the numeral 23. This core has two opposed magnetic poles 24 and 25 that are spaced a short distance from each other. The receiver 12 also includes a frame 26 for supporting the electromagnet 21, and for rotatably supporting an eddy current induction device or disc 27 between the poles 24 and 25 of the core 23. A shaded pole 28 is also provided for the electromagnet and the eddy current disc.

As can best be seen by reference to FIG. 2, the eddy current induction device or disc 27 includes a pair of shafts 29 and 31 extending from either side thereof and passing through the center of the disc. The shaft 29 is affixed to an indicator dial 32 that may be used to indicate speed of an automotive vehicle on a dial face 33. A hair spring 34 is provided to balance the torque acting on the disc 27 that is produced by the interaction of the eddy currents induced in the disc 27 and the magnetic flux between the pole pieces 24 and 25 of the electromagnet 21.

The electric speedometer shown in FIG. 1 is a conventional device and is described by way of example only, to indicate a mechanism in which the eddy current device or disc of this invention may be advantageously employed.

Electric speedometers for automotive vehicle use such as that shown in FIG. 1, must be produced on a mass production basis and as inexpensively as possible. This precludes the use of expensive bearing materials for supporting the shafts 29 and 31 in a substantially frictionless manner as is conventionally accomplished in high precision eddy current mechanisms such as induction watt hour meters, therefore, it may require more torque to rotate this type of eddy current device or disc so employed than would be required in precision type eddy current instruments. The eddy current device or disc of the invention may also be employed in precision type eddy current mechanisms should increased torques be desirable or if it should be desirable to reduce the size of the disc employed.

In order to provide this increased torque, the applicant has provided an improved eddy current induction device or disc 27 in which spaced portions of magnetic material are surrounded by electrical conductive material. The electrical conductive material may have lower permeability than the spaced portions of magnetic material. This may be conveniently accomplished by providing a disc constructed of an electrical conductor having a low magnetic permeability, and having a plurality of spaced perforations positioned therein. These spaced perforations may be filled with a ferromagnetic material.

In FIGS. 2 through 4, there is shown one embodiment of the invention in which an induction device or disc is provided that is constructed of a screen material 34 having a low resistivity, such as copper or aluminum. The openings or perforations 35 in the screen are filled with a material having a high magnetic permeability. This material is designated by the numeral 36 in FIG. 4, while the wires of the screen shown in cross section are designated by the numeral 37. The material 36 of high permeability may be a ferromagnetic material, such as finely powdered iron, that is positioned within the openings 35 in the screen by means of a hydraulic press. This finely powdered material forms a solid mass when put under high pressures, and can be permanently affixed within the screen 35 by means of sintering or by spraying the finished product with a coating of a suitable varnish or lacquer. Prior to the placing of the ferromagnetic material within the openings 35, steps may be taken to insure good electrical contact between the wires 37 of the screen. This may be accomplished by running the screen 34 through a suitable solder bath and removing the excess solder with a jet of compressed air.

FIGS. 5 and 6 show another embodiment of the invention in which the disc 27 is constructed of a material having low electrical resistivity, such as copper and aluminum, and which has a plurality of circular apertures 41 positioned therein. These circular apertures preferably have their centers positioned on the circumference of a circle having a center coincident with the center of the disc 27 and having a diameter substantially less than the diameter of the disc. These circular apertures are filled with circular discs 42 of magnetic material, such as sheet iron or any other suitable ferromagnetic material. These discs may be affixed to the eddy current disc 27 in any suitable manner.

FIGS. 7 and 8 show another embodiment of the induction device or disc 27 that is similar to the embodiment shown in FIG. 5 and 6, except that the disc is provided with a plurality of rectangular apertures 45 rather than with circular apertures. These rectangular apertures 45 are filled with rectangular blocks 46 of magnetic material that are suitably affixed to the eddy current disc 27 in any conventional manner. The rectangular blocks 46 are preferably constructed of iron or other ferromagnetic material.

FIGS. 9 and 10 show still another embodiment of the invention in which a plurality of magnetic wires 51, preferably iron or other ferromagnetic material, are equally spaced from each other in a definite pattern and are surrounded by conductive material 52, such as copper or aluminum. This type of disc may be constructed by placing the wires 51 in a suitable mold and by casting the material 52 around the wires to form a cylindrical mass. This cylindrical mass may then be sliced in a direction perpendicular to the axis of the wires 51 to form a plurality of eddy current induction devices or discs in which the wires 51, as cut, form discs of magnetic material that are surrounded by the cast conductive material 52.

In all of the embodiments of the invention there are provided spaced portions of magnetic material, preferably ferromagnetic material such as iron, that are surrounded by a material having a high conductivity and preferably having a permeability less than that of the magnetic material, for example copper or aluminum. When the eddy current induction device or disc of the present invention is placed within an eddy current induction mechanism such as the speedometer shown in FIG. 1, the flux passing between the poles 24 and 25 of the electromagnet 21, passes through the disc. The spaced portions of magnetic material provide spaced portions in the disc where the flux density is quite high, and is many times higher than the flux density in the portion of the disc surrounding the spaced portions of magnetic material. The flux density in the sections of the disc having the magnetic material is also substantially higher than that found in conventional eddy current discs in which aluminum, copper, or other nonmagnetic material is employed. This increased flux density induces greater currents in the remainder of the disc that is constructed of the material of low electrical resistivity, such as copper or aluminum. These increased currents react with the flux passing between the poles of the magnet employed with the disc to produce higher torques than are found in conventional eddy current devices.

Thus, the present invention provides an improved eddy current device or disc that is capable of producing a large amount of torque in comparison with conventional eddy current devices or discs, and which may be economically and feasibly employed in eddy current mechanisms produced on a mass production basis.

It will be understood that the invention is not to be limited to the exact construction shown and that various changes and modifications may be made without departing from the spirit and scope of the invention as defined in the appended claims.

I claim:

1. An eddy current induction device comprising, an electrically conductive wire screen constructed of a material having a low resistivity and a ferromagnetic material positioned in the openings in the screen.

2. An eddy current device comprising an electrically conductive mesh-type screen, and a finely divided ferromagnetic material positioned in the openings in said screen, thereby forming an eddy current device having a multitude of minute ferromagnets separated by electrical conductors.

3. An eddy current device comprising a relatively fine electrically conductive wire screen, and particle-like ferromagnetic material positioned in the openings in said screen, said particle-like ferromagnetic material being held in said screen by a pressure fit.

4. An eddy current device comprising an electrically conductive wire screen, and a finely divided ferromagnetic material positioned in the openings in said screen, the material of said screen having a permeability substantially lower than said finely divided ferromagnetic material.

5. The eddy current device of claim 4 in which said electrically conductive wire screen is constructed of aluminum.

6. The eddy current device of claim 4 in which said electrically conductive wire screen is constructed of copper.

References Cited in the file of this patent

UNITED STATES PATENTS

| | | |
|---|---|---|
| 653,424 | Lunt | July 10, 1900 |
| 1,748,753 | Bowie | Feb. 25, 1930 |
| 1,999,347 | Urfer | Apr. 30, 1935 |
| 2,119,819 | List | June 7, 1938 |
| 2,740,092 | Lichtenberger | Mar. 27, 1956 |
| 2,769,932 | Zozulin | Nov. 6, 1956 |
| 2,956,189 | Buss | Oct. 11, 1960 |
| 3,027,474 | Rosenberry | Mar. 27, 1962 |